United States Patent
Pourzandi et al.

(10) Patent No.: US 10,268,834 B2
(45) Date of Patent: Apr. 23, 2019

(54) PRIVACY-PRESERVING QUERYING MECHANISM ON PRIVATELY ENCRYPTED DATA ON SEMI-TRUSTED CLOUD

(71) Applicant: Telefonaktiebolaget LM Ericsson (publ), Stockholm (SE)

(72) Inventors: Makan Pourzandi, Montreal (CA); Feras Aljumah, Montreal (CA); Mourad Debbabi, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

(21) Appl. No.: 15/318,482

(22) PCT Filed: Jun. 26, 2014

(86) PCT No.: PCT/IB2014/062636
§ 371 (c)(1),
(2) Date: Dec. 13, 2016

(87) PCT Pub. No.: WO2015/198098
PCT Pub. Date: Dec. 30, 2015

(65) Prior Publication Data
US 2017/0124348 A1  May 4, 2017

(51) Int. Cl.
*G06F 21/62* (2013.01)
*H04L 9/00* (2006.01)
(Continued)

(52) U.S. Cl.
CPC ........ *G06F 21/6227* (2013.01); *G06F 21/602* (2013.01); *G06F 21/6245* (2013.01);
(Continued)

(58) Field of Classification Search
CPC .................................................. G06F 21/6227
See application file for complete search history.

(56) References Cited

U.S. PATENT DOCUMENTS

| 8,515,058 B1* | 8/2013 | Gentry | H04L 9/008 380/28 |
| 2007/0156586 A1* | 7/2007 | Kerschbaum | H04L 9/30 705/50 |

FOREIGN PATENT DOCUMENTS

WO  2005093671 A2  10/2005

OTHER PUBLICATIONS

International Search Report and Written Opinion dated Oct. 24, 2014 for International Application No. PCT/IB2014/062636, International Filing Date: Jun. 26, 2014 consisting of 13-pages.
(Continued)

*Primary Examiner* — Simon P Kanaan
(74) *Attorney, Agent, or Firm* — Christopher & Weisberg, P.A.

(57) ABSTRACT

A method for a survey server for managing query communications between at least a requester server and at least one data holding entity is provided. The requester server holds a first share of a private key and the survey server holds a second share of the private key. An encrypted query is received and then forwarded to at least one data holding entity. A plurality of comparison responses is received. Each comparison response is generated by a private comparison protocol that compares the encrypted query with encrypted data. The encrypted data having been encrypted using the public key. Each comparison response having been partially decrypted with the first share of the private key and placed in the array in a randomized order. The array is decrypted using the second share of the private key. At least one result of the query is determined.

20 Claims, 8 Drawing Sheets

(51) Int. Cl.
    *H04L 9/08* (2006.01)
    *G06F 21/60* (2013.01)
(52) U.S. Cl.
    CPC .............. *H04L 9/008* (2013.01); *H04L 9/085* (2013.01); *H04L 2209/46* (2013.01)

(56) References Cited

OTHER PUBLICATIONS

Yao AC., Title: "Protocols for Secure Computations," Published In: 1982 IEEE 23rd Annual Symposium on Foundations of Computer Science, SFCS'08, (pp. 160-164), Nov. 3, 1982, consisting of 5-pages.
Shafi Goldwasser and Silvio Micali, Title: "Probabilistic Encryption" Published in: Journal of Computer and System Sciences, vol. 28(2):270-299, Apr. 30, 1984, consisting of 30-pages.
Song DX, Wagner D, Perrig A., Title: "Practical Techniques for Searches on Encrypted Data," Published In: Proceedings of 2000 IEEE Symposium on Security and Privacy, S&P 2000. (pp. 44-55), May 14-17, 2000, consisting of 12-pages.
Fischlin M., Title: "A Cost-Effective Pay-Per-Multiplication Comparison Method for Millionaires," Published In: Cryptographers' Track at the RSA Conference (pp. 457-471), Apr. 8, 2001, Springer Berlin Heidelberg consisting of 15-pages.
Hacigümüş H, Iyer B, Li C, Mehrotra S., Title: Executing SQL over Encrypted Data in the Database-Service-Provider Model. Published In: Proceedings of the 2002 ACM SIGMOD International Conference on Management of Data (pp. 216-227), Jun. 3, 2002, consisting of 12-pages.
Katz J, Yung M., Title: "Threshold Cryptosystems Based on Factoring," Published In: International Conference on the Theory and Application of Cryptology and Information Security, (pp. 192-205), Dec. 1, 2002, Springer Berlin Heidelberg consisting of 15-pages.
Jeckert F, Goerz M, Ataian M, Tessmann S, Prokosch HU., Title: "Empowerment of Patients and Communication with Health Care Professionals through an Electronic Health Record," vol. 70(2):99-108, Jul. 21, 2003, consisting of 10-pages.
Damiani E, Vimercati SD, Jajodia S, Paraboschi S, Samarati P., Title: "Balancing Confidentiality and Efficiency in Untrusted Relational DBMSs," Published In: Proceedings of the 10th ACM Conference on Computer and Communications Security, (pp. 93-102), Oct. 27, 2003, consisting of 10-pages.
Iyer B, Mehrotra S, Mykletun E, Tsudik G, Wu Y., Title: "A Framework for Efficient Storage Security in RDBMS," Published In: International Conference on Extending Database Technology, (pp. 147-164), Mar. 14, 2004, Springer Berlin Heidelberg consisting of 18-pages.
Hacigümüş H, Iyer B, Mehrotra S., Title: "Efficient Execution of Aggregation Queries Over Encrypted Relational Databases," Published In: International Conference on Database Systems for Advanced Applications, (pp. 125-136), Mar. 17, 2004, Springer Berlin Heidelberg consisting of 12-pages.
Agrawal R, Kiernan J, Srikant R, Xu Y., Title: "Order Preserving Encryption for Numeric Data," Published In: Proceedings of the 2004 ACM SIGMOD International Conference on Management of Data, (pp. 563-574), Jun. 13, 2004, consisting of 12-pages.

Hore B, Mehrotra S, Tsudik G., Title: "A Privacy-Preserving Index for Range Queries," Published In: Proceedings of the Thirtieth International Conference on Very Large Data Bases, vol. 30, (pp. 720-731), Aug. 31, 2004, consisting of 12-pages.
Okamoto T, Takashima K., Title: "Hierarchical Predicate Encryption for Inner-Products." Published In: International Conference on the Theory and Application of Cryptology and Information Security, (pp. 214-231), Dec. 6, 2009, Springer Berlin Heidelberg consisting of 18-pages.
Hembroff GC, Muftic S., Title: "SAMSON: Secure Access for Medical Smart Cards Over Networks," Published In: 2010 IEEE International Symposium on a World of Wireless Mobile and Multimedia Networks (WoWMoM), (pp. 1-6), Jun. 14, 2010, consisting of 6-pages.
Li M, Yu S, Ren K, Lou W, Title: "Securing Personal Health Records in Cloud Computing: Patient-Centric and Fine-Grained Data Access Control in Multi-owner Settings," Published In: International Conference on Security and Privacy in Communication Systems, (pp. 89-106), Sep. 7, 2010, Springer Berlin Heidelberg consisting of 18-pages.
Jafari M, Safavi-Naini R, Saunders C, Sheppard NP., Title: "Using Digital Rights Management for Securing Data in a Medical Research Environment," Published In: Proceedings of the Tenth Annual ACM Workshop on Digital Rights Management, (pp. 55-60), Oct. 4, 2010, consisting of 6-pages.
Narayan S, Gagné M, Safavi-Naini R., Title: Privacy Preserving EHR System using Attribute-Based Infrastructure, Published In: Proceedings of the 2010 ACM Workshop on Cloud Computing Security Workshop, (pp. 47-52), Oct. 8, 2010, consisting of 6-pages.
Thomas Neubauer and Johannes Heurix, Title: "A Methodology for the Pseudonymization of Medical Data," Published In: International Journal of Medical Informatics, vol. 80(3):190-204, Mar. 2011, consisting of 3-pages.
Li M, Yu S, Cao N, Lou W., Title: Authorized Private Keyword Search over Encrypted Personal Health Records in Cloud Computing, Published In: 2011 31st International Conference on Distributed Computing Systems (ICDCS), (pp. 383-392), Jun. 20, 2011, consisting of 12-pages.
Akinyele JA, Pagano MW, Green MD, Lehmann CU, Peterson ZN, Rubin AD., Title: "Securing Electronic Medical Records Using Attribute-Based Encryption on Mobile Devices," Published In: Proceedings of the 1st ACM Workshop on Security and Privacy in Smartphones and Mobile Devices, (pp. 75-86), Oct. 17, 2011, consisting of 13-pages.
Popa RA, Redfield C, Zeldovich N, Balakrishnan H., Title: CryptDB: Protecting Confidentiality with Encrypted Query Processing, Published In: Proceedings of the Twenty-Third ACM Symposium on Operating Systems Principles, (pp. 85-100), Oct. 23, 2011, consisting of 16-pages.
Hupperich T, Löhr H, Sadeghi AR, Winandy M., Title: Flexible Patient-Controlled Security for Electronic Health Records, Published In: Proceedings of the 2nd ACM SIGHIT International Health Informatics Symposium, (pp. 727-732), Jan. 28, 2012, consisting of 5-pages.
Ayday et al., Title: "Privacy-Enhancing Technologies for Medical Tests Using Genomic Data"—Technical Report, Dec. 28, 2012, consisting of 16-pages.
Barouti et al., Title: "Secure and Privacy-Preserving Querying of Personal Health Records in the Cloud" May 6, 2014, consisting of 16-pages.

\* cited by examiner

PRIVACY-PRESERVING QUERYING MECHANISM ON PRIVATELY ENCRYPTED DATA ON SEMI-TRUSTED CLOUD

CROSS-REFERENCE TO RELATED APPLICATIONS

This application is a Submission Under 35 U.S.C. § 371 for U.S. National Stage Patent Application of International Application Number: PCT/IB2014/062636, filed Jun. 26, 2014 entitled "PRIVACY-PRESERVING QUERYING MECHANISM ON PRIVATELY ENCRYPTED DATA ON SEMI-TRUSTED CLOUD," the entirety of which is incorporated herein by reference.

FIELD

The present invention relates to data querying, and in particular to querying encrypted data on a semi-trusted network while preserving the privacy of the data and the entity requesting the query.

BACKGROUND

Various entities such as individuals, companies and governments continue to gravitate toward storage of sensitive data in the "cloud", e.g. the internet, that is composed of one or more networked data servers. The sensitive data stored in the cloud may vary from personal health records (PHR) to private financial information, among other sensitive data. The cloud provides flexible data storage and accessibility options that can be dynamically modified to meet the storage needs of the various entities.

While the cloud environment provides flexibility, the security of the sensitive data in the cloud environment continues to be an issue. Data encryption is commonly used to ensure that access to the sensitive data is only possible when the correct decryption key is provided. In some systems, trust is given to the cloud service provider to manage the encryption keys on the entity's behalf. This implies that although the data is encrypted, the cloud service provider has the ability to see the unencrypted sensitive data. For example, even though personal health records may be encrypted in the cloud, the encryption keys are managed by the personal health record system provider. Therefore, it is possible for anyone with access to the cloud provider's infrastructure to gain access to all the records.

In one system, PHR using Attribute Based Encryption (ABE) is utilized to encrypt and store PHRs on semi-trusted servers using access control policies chosen by patients. Although the use of ABE PHR systems preserve the privacy of patients, these systems disadvantageously prevent health organizations from querying the PHRs on the system. To produce statistical information about PHRs, patients would have to give health organizations access to all PHRs using ABE. However, health organizations often fall short in protecting the privacy and security of patient information. Further, some of these health organizations also end up having at least one issue with information security and privacy. For example, the most frequently observed issue is the improper use of protected health information by an employee of the organization.

In other types of systems, it is possible to build a privacy preserving system where data is encrypted, and users keep the decryption keys to ensure access is not given to the cloud service providers. However, this approach is not popular due to the limited features such as data sharing and data querying that the cloud service provider can provide due to the user held decryption keys.

Querying of sensitive data is an important feature that is often relied upon by PHR system providers in order to perform general data querying to generate statistical information. For example, general data querying may include querying PHRs for a number of people over the age of forty-five that have a particular disease. However, as described above, if the cloud service provider is allowed to decrypt the sensitive data stored in the cloud in order to run the requested query, the cloud service provider or anyone having access to the cloud service provider's infrastructure may be able to access the sensitive data without authorization.

Therefore, the querying of sensitive data to generate statistical information becomes a problem of making private comparisons as described in Yao's classical millionaires problem. This problem involves two millionaires who wish to know who is richer. However, they do not want to find out, inadvertently, any additional information about each other's wealth. More formally, given two input values x and y, which are held as private inputs by two parties, respectively, the problem is to securely evaluate the Greater Than (GT) condition x>y without exposing the inputs.

One solution is to assume a trusted server and another solution is to assume that the server is semi-trusted. One proposed semi-trusted solution uses a trapdoor encryption method, where two layers of encryption are used. The first layer uses a symmetric key with a secret key, while the second layer uses a pseudo-random number generator and two random pseudo-random functions. However, this trapdoor encryption method only allows for querying for equality. Another proposed semi-trusted solution that builds off the trapdoor encryption method adds secure indices. Another solution modifies this previous add-on such that the data is classified by a collusion hash functions, thus increasing security by preventing the data from being classified sequentially. Another proposed solution for range queries is an encryption scheme for numerical data that allows comparisons to be executed directly on the encrypted data.

Although the above-described solutions have been proposed for secure databases hosted on a cloud server, they cannot be adapted to the above described problem for several reasons. First, to evaluate the query on the encrypted sensitive data, the organization such as the health organization must encrypt the query by the same scheme and the same key that are used by the data owners such as the patients, and send the query to the cloud server. The cloud server may then forward the encrypted query to the data owners, where the query can be decrypted by the encryption key. However, this technique for secure database outsourcing will not protect the query privacy and the database privacy. Second, a common approach in the existing proposed systems is to send a set of encrypted records to the data owner for filtration and further processing. This other technique for secure database outsourcing will not protect the query privacy and the database privacy.

Another solution that has been proposed is to execute Structured Query Language (SQL) queries over encrypted data. This proposed solution depends on a fully trusted component that maintains all the secret and public keys and transforms the requester's SQL queries to a query that can be executed over encrypted records. While this solution has low overhead on query execution time, it requires a fully trusted component which disadvantageously provides a single point of attack. Another solution involves storing records such as Electronic Health Records (EHRs) in an untrusted cloud environment and encrypted using symmetric key cryptography. This solution allows patients to choose what terms in the sensitive data can be searched, and who may be able to access the search terms. This solution also relies on there being a trusted authorized entity who generates keys for users of the system. However, this solution is limited as only specific keywords chosen by the patient can be searched. Further, this and the other described solutions are vulnerable to known plaintext attacks due to the fact that the keywords are encrypted using a symmetric key.

SUMMARY OF THE INVENTION

The present invention advantageously provides a method and system for searching encrypted data on a semi-trusted network while preserving the privacy of the data and the entity requesting the query.

According to one embodiment of the invention, a survey server for managing a query for information from a requester server is provided. The requester server holds a first share of a private key and the survey server holds a second share of the private key. The private key is associated with a public key in an asymmetric cryptosystem. The survey server includes a transceiver configured to receive an encrypted query from the requester server, the query being encrypted using the public key and forward the query from the requester server to at least one data holding entity. The transceiver is further configured to, in response to the forwarding of the query, receive a plurality of comparison responses from the at least one data holding entity. Each comparison response is generated by a private comparison protocol that compares the encrypted query with encrypted data of the at least one data holding entity. The encrypted data having been encrypted using the public key. The transceiver is further configured to forward the plurality of comparison responses to the requester server and receive a randomized array including the plurality of comparison responses. Each comparison response having been partially decrypted with the first share of the private key and placed in the array in a randomized order. The requester server further includes a processor configured to decrypt the randomized array using the second share of the private key, determine at least one result of the query based at least in part on the decrypted randomized array and instruct the transceiver to send the at least one result of the query to the requester server.

According to one embodiment of this aspect, the private comparison protocol is based on homomorphic cryptography. The private comparison protocol is Fischlin's protocol. The asymmetric cryptosystem is a semantically secure cryptosystem that allows for secure private comparison between encrypted values. The query from the requester server includes at least one constant that is encrypted using the semantically secure cryptosystem and at least one comparison condition for comparing the constants to encrypted data. The semantically security cryptosystem is a Goldwasser-Micali cryptosystem. The at least comparison condition is at least one of an equal to condition, greater than condition and less than condition. Each of the plurality of responses includes at least one ciphertext sequence that is encrypted by the asymmetric cryptosystem.

According to another embodiment of the invention, a method for a survey server for managing query communications between at least a requester server and at least one data holding entity is provided. The requester server holds a first share of a private key and the survey server holds a second share of the private key. The private key is associated with a public key in an asymmetric cryptosystem. An encrypted query for information is received from the requester server. The query is encrypted using the public key. The query from the requester server is forwarded to at least one data holding entity. In response to the forwarding of the query, a plurality of comparison responses is received from the at least one data holding entity. Each comparison response is generated by a private comparison protocol that compares the encrypted query with encrypted data of the at least one data holding entity. The encrypted data having been encrypted using the public key. The plurality of comparison responses are forwarded to the requester server. A randomized array including the plurality of comparison responses is received. Each comparison response having been partially decrypted with the first share of the private key and placed in the array in a randomized order. The randomized array is decrypted using the second share of the private key. At least one result of the query is determined based at least in part on the decrypted randomized array. The at least one result of the query is sent to the requester server.

According to one embodiment of this aspect, the private comparison protocol is based on homomorphic cryptography. The private comparison protocol is Fischlin's protocol. The asymmetric cryptosystem is a semantically secure cryptosystem that allows for secure private comparison between encrypted values. The query from the requesting server includes at least one constant that is encrypted using the semantically secure cryptosystem and at least one comparison condition for comparing the constants to encrypted data. The at least comparison condition is at least one of an equal to condition, greater than condition and less than condition. Each of the plurality of comparison responses includes at least one ciphertext sequence that is encrypted by the asymmetric cryptosystem.

According to another embodiment of the invention, a survey server for managing a query from a requester server is provided. The requester server holds a first share of a private key and the survey server holding a second share of the private key. The private key is associated with a pubic key in a asymmetric cryptosystem. The survey server includes a transceiver module configured to receive an encrypted query request from the requester server, the query being encrypted using the public key and forward the query from the requester server to at least one data holding entity. The transceiver module is further configured to, in response to the forwarding of the query, receive a plurality of comparison responses from the at least one data holding entity. Each comparison response is generated by a private comparison protocol that compares the encrypted query with encrypted data of the data holding entity. The encrypted data having been encrypted using the public key. The transceiver module is further configured to forward the plurality of comparison responses to the requester server and receive a randomized array including the plurality of comparison responses. Each comparison response having been partially decrypted with the first share of the private key and placed in the array in randomized order by the requester server. The survey server includes a processing module configured to decrypt the randomized array using the second share of the private key, determine at least one result of the query based at least in part on the decrypted randomized array, and instruct the transceiver module to send the at least one result of the query to the requester server.

According to one embodiment of this aspect, the private comparison protocol is Fischlin's protocol. The asymmetric cryptosystem is a semantically secure cryptosystem that allows for secure private comparison between encrypted values. The query from the requesting server includes at least one constant that is encrypted using the semantically secure cryptosystem and at least one comparison condition for comparing the constants to encrypted data. The at least comparison condition is at least one of an equal to condition, greater than condition and less than condition. Each of the plurality of comparison responses includes at least one ciphertext sequence that is encrypted by the asymmetric cryptosystem.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

A server and method for searching encrypted data on a semi-trusted network while preserving the privacy of the data and the entity requesting the query. In one embodiment, health organizations are allowed to search privately encrypted data on a semi-trusted cloud while preserving the privacy of the patients and the health organization. The present invention advantageously uses an asymmetric cryptosystem such as a semantically secure cryptosystem, e.g., a Goldwasser-Micali (GM) cryptosystem or other cryptosystem, along with a private comparison protocol based on homomorphic cryptography, e.g., Fischlin's protocol or other private comparison protocol, to enable the data owners such as patients to securely compare the values in their records such as PHRs to encrypted constants in the requester's, e.g., health organization's, query. The present invention is based on the use of threshold encryption that allows the querying requester and the survey server to cooperate to execute the query without comprising the privacy of the query requester and the data owner. Threshold encryption, as implemented by the present invention, allows a survey server 14 (discussed below) to execute queries while the survey server is not trusted to see any of the constants in the query and/or the values in the records, e.g., PHRs. Therefore, the present invention advantageously allows querying of encrypted data under the assumption of not having a trusted entity in the system. This means, within the health care context, that data holding entity 18 (discussed below) does not trust the system or health organization, i.e., requester server 12 (discussed below), to see the medical records. Further, not having a trusted entity means that the health organization doesn't trust the system or the patients, i.e., data holding entity 18, to see the constants in the health organization's query.

Further, the present invention provides a protocol that uses private comparison protocols, e.g., Fischlin's protocol, based homomorphic cryptosystem, etc., along with asymmetric cryptosystem, e.g., semantically security cryptography, GM cryptosystem, etc., to compare encrypted values. Also, threshold GM cryptography is implemented by the present invention to prevent the health organization or the survey server from viewing the actual patient data. Randomization of the results is also used, as discussed below, to help prevent the survey server from correlating a result of the query to a specific data owner, e.g., patient. Therefore, the present invention provides secure extraction of data from patients' responses based on sharing the responsibilities of this extraction between the survey server in the cloud and the health organization using the techniques of threshold Crypto and GM-Fischlin to hide from both the survey server and health organization the mapping between the final result(s)/answer(s) and the patients.

While the present invention is discussed with respect to heath organizations and records, the protocols and methods described herein are equally applicable to systems where a first party wants to query data of a second party and neither party trusts the other with any data other than the final results of the query. Some examples of other applications are credit card companies querying private e-commerce data to find credit card fraud or identity theft cases or insurance providers querying pharmacies for illegal abuses by patients, doctors or pharmacists related to drug prescriptions, among other applications.

Accordingly, the device and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
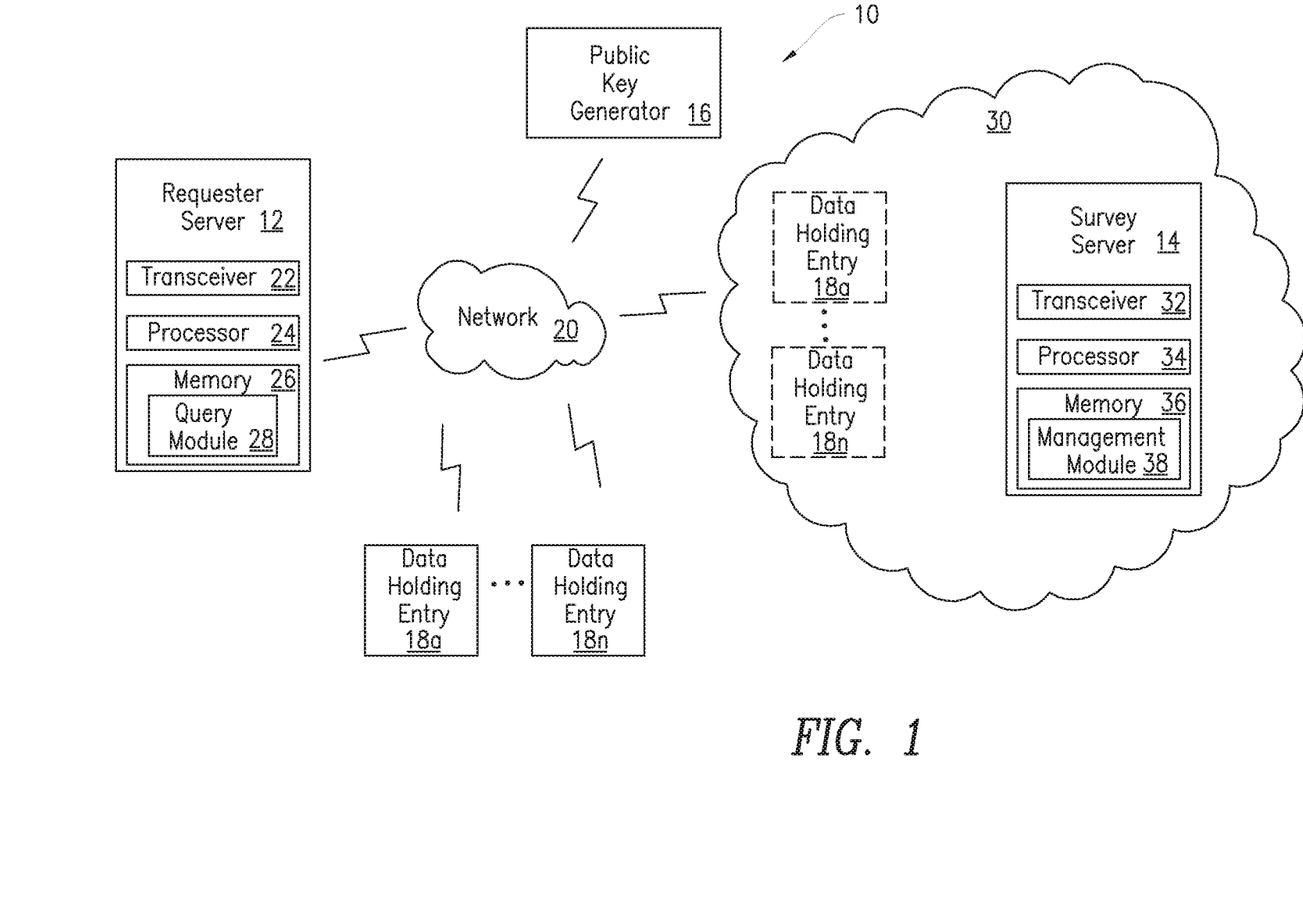
FIG. 1 is a block diagram of a communication system providing the query management in accordance with the principles of the present invention.

Referring now to drawing figures in which like reference designators refer to like elements there is shown in FIG. 1 an exemplary system for querying encrypted data on a semi-trusted network while preserving the privacy of the data and the entity requesting the query in accordance with the principles of the present invention and designated generally as "10." System 10 includes one or more requester servers 12, one or more survey servers 14, one or more public key generators 16 and one or more data holding entities 18a-18n (collectively referred to as data holding entity 18) all in communication with each other via one or more networks 20. Requester server 12 is associated with one or more entities that are trusted to run queries on sensitive data but are not trusted to see more than the final result of the query, i.e., are not trusted to see the unencrypted data being queried. For example, requester server 12 may be associated with a health organization, credit card company or insurance provider, among other types of service providers. Requester server 12 may include one or transceivers 22 for communication with survey server 14 and public key generator 16, among other devices, servers and entities, via network 20. Alternatively, one or more transceivers 22 may be one or more separate transmitters and receivers.

Requester server 12 further includes processor 24 that includes one or more central processing units (CPUs) for performing the requester server functions described herein. Requester server 12 includes memory 26 that stores query module 28, among other data and modules. Memory 26 may include non-volatile and volatile memory. For example, non-volatile memory may include a hard drive, flash memory, memory stick and the like. Also, volatile memory may include random access memory and others known in the art. Memory 26 may store program instructions such as those for query module 28 for querying one or more data holding entities for information. For example, query module 28 includes instructions, which when executed by processor 24, cause processor 24 to perform the query process, discussed in detail with reference to FIGS. 3, 4 and 5.

Survey server 14 is an intermediary entity in cloud 30 between requester server 12 and data holding entity 18. In particular, survey server 14 is trusted by requester server 12 and data holding entity 18 to execute queries but neither requester server 12 nor data holding entity 18 trust survey server 14 to access the unencrypted data that is the subject of the queries. In the health records example, survey server 14 is an intermediary entity in cloud 30 between the patient devices, i.e., data holding entities 18, and the querying health organizations, i.e., requester server 12, trusted to help manage the execution of the query. The patients, i.e., data owners, associated with patient devices, i.e., data holding entity 18, and the health organization trust survey server 14 to execute the queries, but neither entity trusts survey server 14 to see the unencrypted data.

Survey server 14 may include one or more transceivers 32, one or more processors 34 and memory 36 in communication with each other. Transceiver 32, processor 34 and memory 36 may generally correspond to the components in requester server 12, with size and performance being adjusted based on design needs, while providing the functionality described herein with respect to survey server 14. For example, transceiver 32 may provide communications to/from requester server 12, public key generator 16 and data holding entity 18, among other devices, entities and servers. Memory 36 may store management module 38, among other data and modules. Management module 38 performs the query management process. For example, management module 38 includes instructions, which when executed by processor 34, causes processor 34 to perform the query management process, discussed in detail below with respect to FIGS. 3, 4 and 6. Further, one or more clouds 30 may be one or more semi-trusted clouds that may be formed by one or more networked data servers. In one embodiment, survey server 14 is part of another cloud or another network.

Public key generator 16 may include components such as transceiver, processor and memory substantially similar to requester server 12 and survey server 14, with size and performance being adjusted based on design need, while providing the functionality described herein with respect to public key generator 16. For example, public key generator 16 is responsible for generating multiple keys such a public key, first share of a private key and a second share of a private key, among other keys for cryptography, in system 10 as is discussed in detail with respect to FIGS. 3, 4 and 8. Public key generator 16 is the only trusted entity or server in system 10. Public key generator 16 may be in cloud 30 or in another network. Public key generator 16 may be in communication with requester server 12, survey server 14 and data holding entity 18, among other servers, via network 20.

Data holding entity 18 may be a device associated with one or more users, i.e., data owners. Data holding entity 18 may not be trusted to know what requester server 12 is querying for and/or the final result of the query. Data associated with data holding entity 18 may be stored in cloud 30 and/or in memory of data holding entity 18. The data associated with data holding entity 18 may be encrypted. Data holding entity 18 may include components such as transceiver, processor and memory substantially similar to requester server 12 and survey server 14, with size and performance being adjusted based on design need, while providing the functionality described herein with respect to data holding entity 18. In particular, data holding entity 18 may be a user device such as laptop, computer, mobile device and tablet, among other devices, that is configured to store, retrieve and/or download data from cloud 30. Alternatively, one or more data holding entities 18 may be devices or servers located in cloud 30 and/or outside of cloud 30 in another network.

Figure 2:
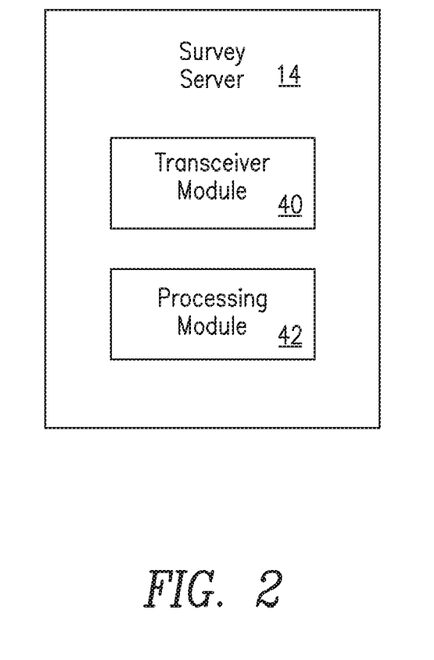
FIG. 2 is a block diagram of an alternative embodiment of survey server in accordance with the principles of the present invention.

While the modules described herein are discussed as being software stored in memory, the modules may be hardware based or software-hardware based. Further, separate programs can be a single program. An alternative embodiment of survey server 14 for management of a query is described with reference to FIG. 2. Survey server 14 includes transceiver module 40 and processing module 42 for performing the process described herein, with respect to FIGS. 3, 4 and 6. Transceiver module 40 is configured to perform Blocks 138-S146 as discussed in detail with respect to FIG. 6. Processing module 42 may be configured to perform Blocks S148-S152 as discussed in detail with respect to FIG. 6.

Network 20 may include communication networks such as wide area networks, local area networks, wireless local area network, long term evolution (LTE) network and the like, among other wired and/or wireless networks. Network 20 provides communication between to/from elements illustrated in FIG. 1. In one embodiment, cloud 30 is part of network 20.

Exemplary signaling between elements of system 10 for querying and query management is described with reference to FIG. 3. Requester server 12 transmits a request for session keys for a query (S100). For example, in response to an indication from a user associated with requester server 12 to perform a query, transceiver 22 of requester server 12 sends a request for session keys for the query. Public key generator (PKG) 16 determines sessions keys in response to the received request from requester server 12. In particular, PKG 16 determines a private, i.e., secret key (sk) and a public key (pk) in which the private key (sk) is split into a first share of the private key ($sk_1$) and a second share of the private key ($sk_2$) as discussed in detail with respect to FIG. 8. PKG 16 transmits the public key (pk) with the first share of the private key ($sk_1$) to requester server 12 (S102). PKG 16 transmits the public key (pk) with the second share of the private key ($sk_2$) to survey server 14 (S104). PKG 16 also transmits the public key (pk) data holding entity 18.

Figure 5:
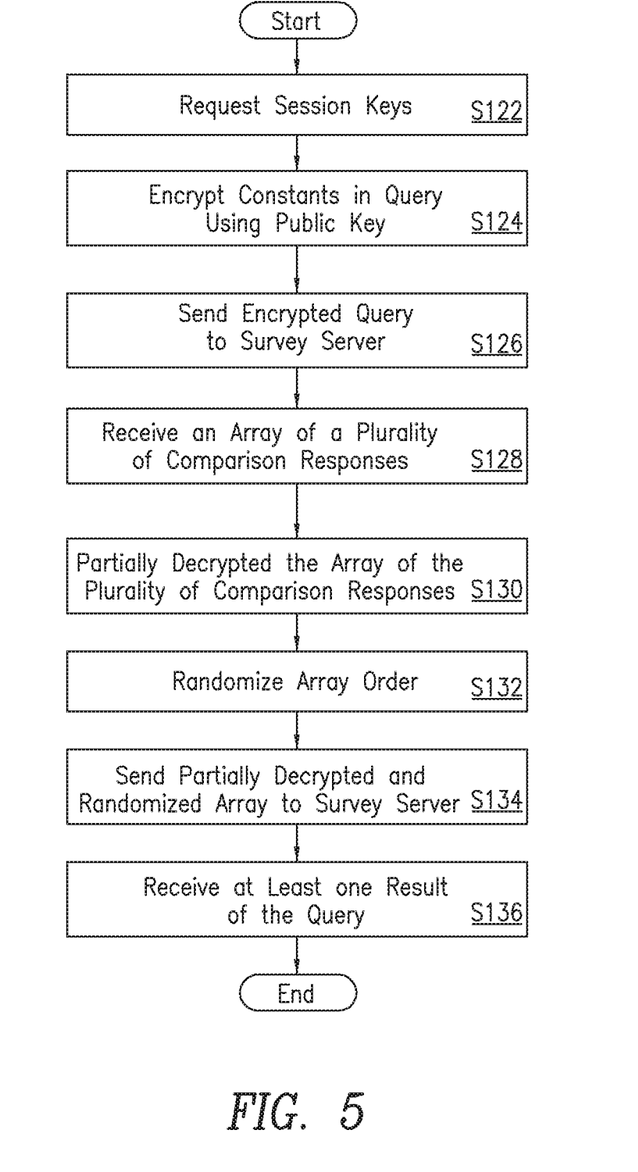
FIG. 5 is a block diagram of a query process in accordance with the principles of the present invention.

Requester server 12 encrypts the query, as discussed below with respect to FIG. 5, and transmits the encrypted query to survey server 14 (S106). For example, a query that requests a total number of patients under the age of twenty that have diabetes may be as follows:

SQLCOUNT(*)FROMPatientData
WHEREAge<$E_{pk}$ {20}
ANDDiabetes=$E_{pk}$ {1} where the constants 20 and 1 have been encrypted by requester server 12 using the public key (pk). The query may include at least one comparison condition such as an equal to condition (=), greater than condition (>), less than condition (<) and/or other conditions for comparing two values. For example, the query described above includes less than and equal to conditions. Survey server 14 forwards the encrypted query to one or more data holding entities 18 (S108). In response to receiving the forwarded query, data holding entity 18 requests data from cloud 30 (S110). For example, data holding entity 18 may own and be in control of data, e.g., patient data, that is stored in a central repository, e.g., within cloud 30, such that data holding entity 18 may request retrieval of this data from the central repository within cloud 30. In response to the request from data holding entity 18 for data, cloud 30 transports encrypted data to data holding entity 18 (S112).

After data holding entity 18 receives the requested data from cloud 30, data holding entity 18 encrypts values of the corresponding requested data related to the query using the public key (pk) and performs a private comparison by running a secure private comparison protocol such as a protocol based on homomorphic cryptography that compares encrypted constants in the query to corresponding encrypted values in the received/requested data. Private comparison, as used herein, refers to one or more computations carried out on encrypted data, e.g., ciphertext, that generate an encrypted result which, when decrypted, matches the result as if the one or more computations had been performed on the unencrypted data, e.g., plaintext. In other words, private comparisons such as homomorphic cryptography comparisons allow encrypted data, i.e., ciphertext, to be analyzed and manipulated as if the unencrypted data, itself, were being analyzed and manipulated, thereby preserving the privacy of the encrypted data. While the private comparison protocol is described herein as being based on homomorphic cryptography such as Fischlin's protocol, other private comparison protocols may be used that are compatible with the cryptosystem being implemented such as to allow for privacy-preserved querying on privately encrypted data, as described herein. Therefore, mathematical operations, i.e., private comparisons, can be performed on encrypted data without compromising the encryption.

Figure 6:
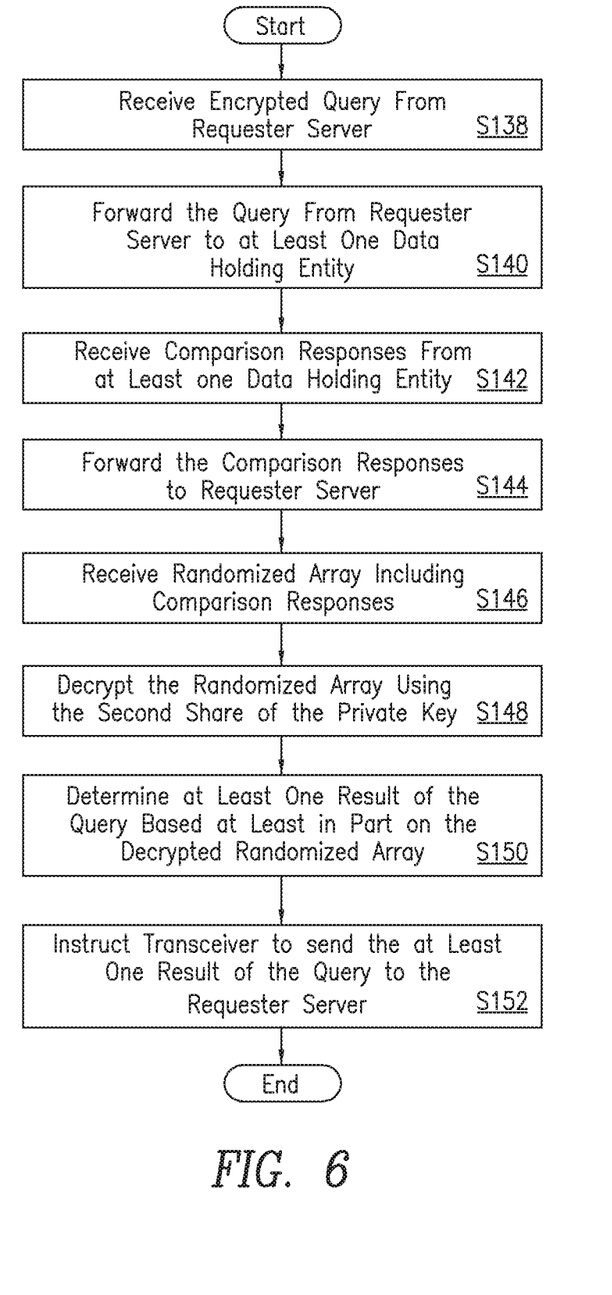
FIG. 6 is a block diagram of a query management process in accordance with the principles of the present invention.

In one embodiment, the homomorphic cryptography is Fischlin's protocol. For example, comparisons using Fischlin's protocol may be generated as follows:

RunFischlin($E_{pk}$ {myAge}, $E_{pk}$ {20}) and
Run Fischlin ($E_{pk}$ {myDiabeties}, $E_{pk}$ {1})

wherein myAge and myDiabeties correspond to requested values received from cloud 30. Data holding entity 18 then sends the output from the private comparison to the survey server 16 (S114). In one embodiment, the private comparison protocol that compares encrypted values is based on homomorphic cryptography such a Fischlin's protocol that outputs two ciphertext sequences delta (A) and (c). For example, the output may be as follows:

($E_{sk}\{\Delta\},E_{sk}\{c\})_{Age}$, ($E_{sk}\{\Delta\},E_{sk}\{c\})_{Diabetes}$ After survey server 14 receives one or more comparison responses, i.e., outputs from the private comparison protocol, from data holding entity 18, survey server 14 generates and sends an array of comparison response to requester server 12 (S116) as discussed in detail with respect to FIG. 6. Requester server 12 uses the first share of the private key ($sk_1$) to partially decrypt all of the values in the array. Requester server 12 also randomizes the order of the records/values in the array before sending the partially decrypted and randomized array to survey server 14 (S118). For example, the partially decrypted and randomized array ($E'_{sk}\{\Delta\},E'_{sk}\{c\})_{Age}$, ($E'_{sk}\{\Delta\},E'_{sk}\{c\})_{Diabetes}$ may be generated as follows:

For (i=0; i<sizeOfArray; i++)
RunPartialDecrpyt($\Delta_i$, $sk_1$);
RunPartialDecrpyt($c_i$, $sk_1$);
Randomize(array)

Survey server 14 receives the decrypted and partially randomized array, and uses the second share of the private key ($sk_2$) to complete the decryption of values in the array. For example, survey server 14 may complete the decryption as follows:

for (i=0; i<sizeOfArray; i++)
RunPartialDecrpyt($\Delta_i$, $sk_2$);
RunPartialDecrpyt($c_i$, $sk_2$);
Randomize(array)

After completing the decryption, survey server 14 determines the final result or answer to the query. For example, if the homomorphic cryptography used is Fischlin's protocol, survey server 14 may run the following steps for all rows in the array to get the total number of patients verifying the conditions of query:

if there exist a sequence of λ quadratic residues then
  output x>y
else if the decryptions of all $c_1 \ldots c_n$ are all 1s then
  output x=y
else output x<y Survey server 14 then sends the final result of the homomorphic cryptography to requester server 12 (S120). For example, if the query was to find out how many patients under the age of 25 have diabetes, the final result of the homomorphic cryptography would indicate how many patients in the system, i.e., queried data holding entities 18, were over 25, how many were under 25, how many had diabetes and how many do not have diabetes but would not provide other information of data holding entity 18, while at the same time preserving the privacy of the health organization and the patients. The final result does not includes the individual comparison results for each patient, only the final result(s) of or answer(s) to the query.

Figure 3:
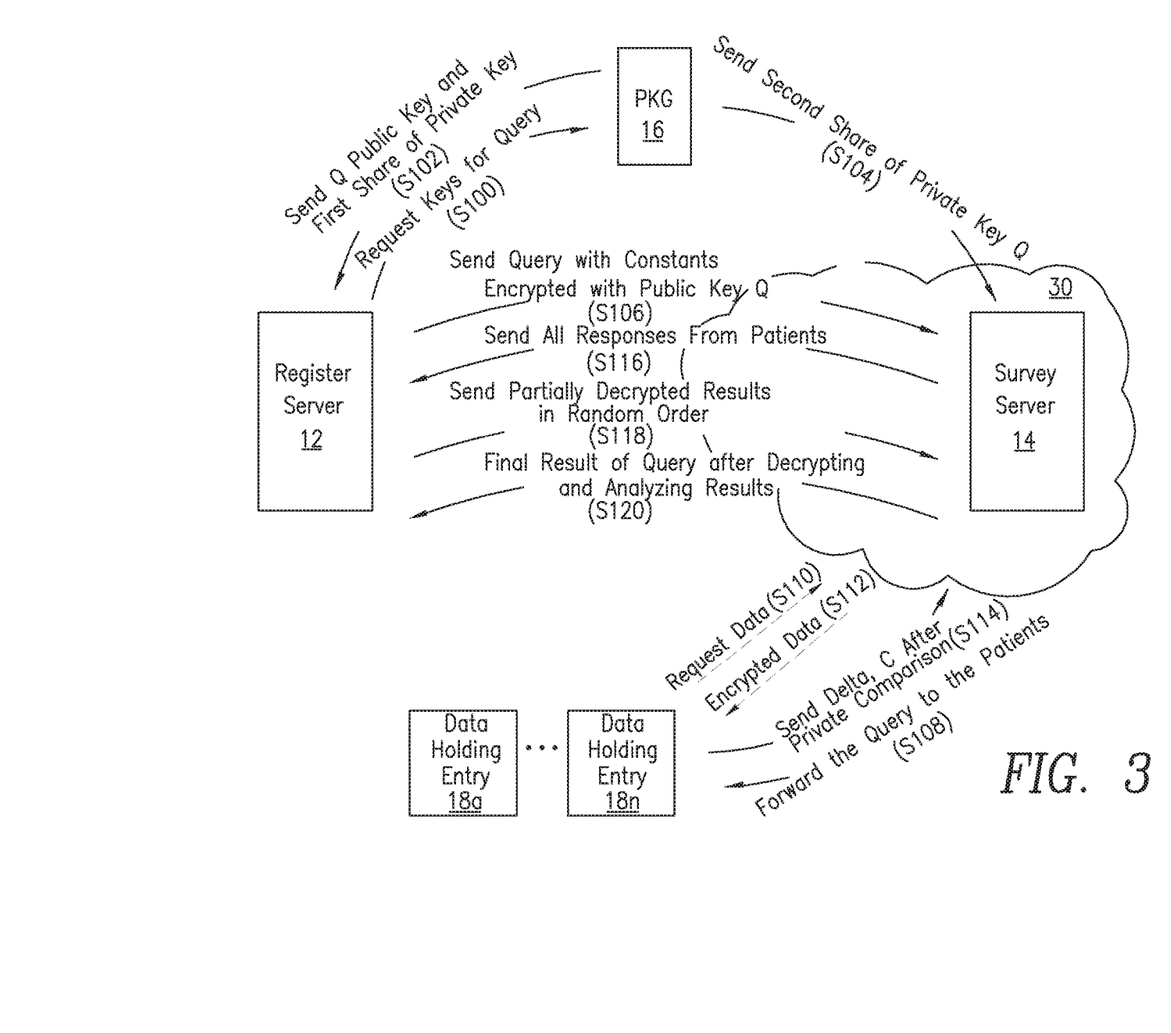
FIG. 3 is a block diagram of the communication system illustrates the signaling in accordance with the principles of the present invention.
Figure 4:
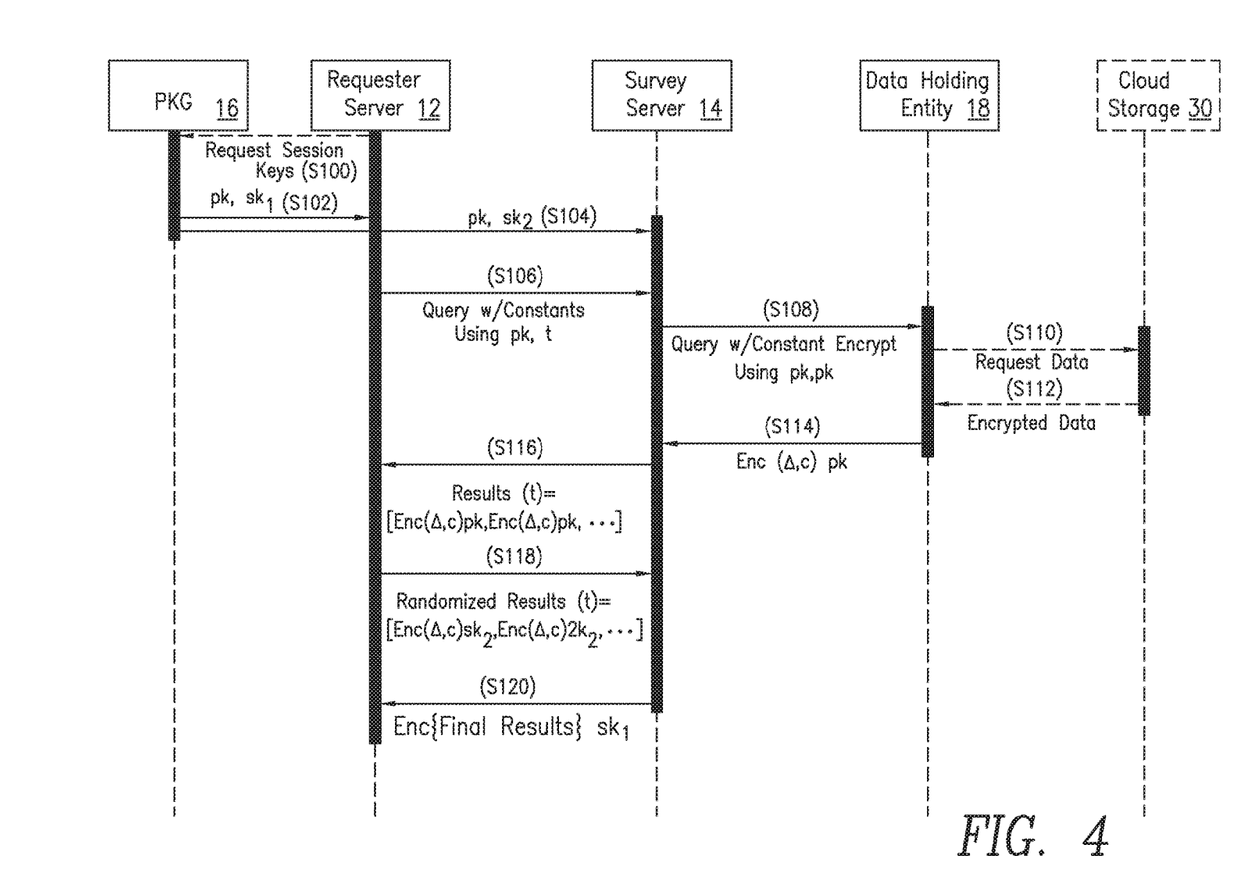
FIG. 4 is signaling flow diagram of FIG. 3 in accordance with the principles of the present invention.

An exemplary signaling diagram of the communications depicted in FIG. 3 is illustrated in FIG. 4. An exemplary query process by which requester server 12 queries data holding entity 18 is described with reference to FIG. 5. Processor 24 causes transceiver 22 to request session keys from public key generator 16 (Block S122). For example, in response to an indication from a user of requester server 12 to perform a query, processor 24 causes transceiver 22 to request session keys for the query. In response to the transmitted request for session keys, requester server 12 receives a pubic key and a first share of a private key. For example, public key generator 16 issues a Goldwasser-Micali (GM) cryptosystem session key pair including a private or secret key (sk) and public key (pk) in which the public key is made public, i.e., transmitted, to multiple entities in system 10 such as to requester server 12 and data holding entity 18, and first share of the private key (sk₁) is transmitted to requester server 12.

Processor 24 is configured to encrypt constant(s) in the query using the public key (pk) (Block S124). One or more constants may correspond to one or more values to be used in the query. Encrypting the constants in the query preserves the privacy of the entity making the query, e.g., health organization or insurance company, by not indicating what the query is searching for. In the SQLCOUNT example above, the encrypted query requests a total number of patients under the age of twenty that have diabetes such that constants 20 and 1 have been encrypted by requester server 12 using public key (pk).

Processor 24 is configured to cause transceiver 22 to send the encrypted query to survey server 14 (Block S126). In response to the transmitted encrypted query, transceiver 22 may receive an array with multiple comparison responses (Block S128). In the example discussed above, the comparison responses from each data holding entity may be the output of a private comparison protocol based on homomorphic cryptography such as a Fischlin's protocol with outputs (Δ,c). Processor 24 partially decrypts the values in the array using the first share of the private key (sk₁) (Block S130).

Processor 24 randomizes the order of the values in the array such that survey server 14 will not be able to correlate values in the array with a specific data holding entity 18 (Block S132). Processor 24 causes transceiver 22 to send the partially decrypted and randomized array to survey server 14 for determination of a final result(s) or answer(s) to the query (Block S134). Randomizing the values in the array helps prevent someone or even survey server 14 from correlating values or result within a query to a specific data holding entity 18.

Transceiver 22 receives at least one result or answer to the query (Block S136). For example, if the query was to find out how many patients under the age of 25 have diabetes, the at least one result or answer to the query would indicate how many patients in the system, i.e., queried data holding entities 18, were over 25, how many were under 25, how many had diabetes and how many do not have diabetes but would not provide other information of data holding entity 18, while at the same time preserving the privacy of the health organization and the patients. The at least one result or answer to the query does not includes the individual comparison results for each patient, only the final result(s) of or answer(s) to the query.

Therefore, requester server 12 has not gained any knowledge beyond the final result of the query. For example, if the query was to find out how many patients under 25 had diabetes, the final results would indicate how many in the system, i.e., queried data holding entities 18, were over 25, how many were under 25, how many had diabetes and how many do not have diabetes but would not provide other information of data holding entity 18, while at the same time preserving the privacy of the health organization and the patients.

An exemplary management process of survey server 14 for managing the query process after receipt of the second share of private key (sk₂) is described with reference to FIG. 6. In particular, FIG. 6 describes the specific processes in FIG. 3 and FIG. 4 that are performed by survey server 14. Transceiver 32 receives an encrypted query from requester server 14 as described in S106 (Block S138). Processor 34 causes transceiver 32 to forward the query with constants encrypted using public key (pk) to at least one data holding entity 18 as described in S108 (Block S140). Transceiver 32 receives comparison responses from the at least one data holding entity 18 as described in S114 (Block S142). In one embodiment, survey server 14 may wait for a predefined minimum amount (t) of comparison responses to be received or may wait a predetermined time (t) to receive the comparison responses from at least one data holding entity 18. This predefined minimum amount (t) and/or predetermined time (t) may be defined by or included in the query from requester server 12.

Processor 34 causes transceiver 32 to forward the comparison responses to requester server 12 (Block S144). For example, processor 34 may generate an array of comparison responses for transmission to requester server 12. Transceiver 32 receives a randomized and partially decrypted array including comparison results as described in S118 (Block S146). Processor 34 decrypts, i.e., completes decryption, of the randomized array using the second share of the private key (sk₂). Processor 34 determines at least one result or answer to the query based at least in part on the decrypted randomized array (Block S150). For example, the decryption of values, e.g., multiple (Δ, c)s, in the array reveals the result of comparing the private inputs, i.e., encrypted query constants and data values, without revealing any information beyond the result of the comparison. In one embodiment, Fishclin's protocol is applied in which Fischlin's protocol utilizes the XOR-homomorphic GM cryptosystem to privately compute the final result:

$$x > y \Leftrightarrow \bigvee_{i=1}^{n} (x_i \wedge -y_i \wedge \bigwedge_{j=i+1}^{n} (x_j = y_j))$$
$$\Leftrightarrow \bigoplus_{i=1}^{n} (x_i \wedge -y_i \wedge \bigwedge_{j=i+1}^{n} -(x_i \oplus y_i))$$

where $|x| = |y| = n$.

Processor 34 instructs transceiver 32 to send the at least one result of the query to requester server 12 (Block S152). For example, as discussed above, if the query was to find out how many patients under the age of 25 have diabetes, the at least one result sent by transceiver 32 would indicate how many patients in the system, i.e., queried data holding entities 18, were over 25, how many were under 25, how many had diabetes and how many do not have diabetes but would not provide other information of data holding entity 18, while at the same time preserving the privacy of the health organization and the patients. The individual comparison results for each patient are not send to requested server 12, only the final result(s) of or answer(s) to the query.

Figure 7:
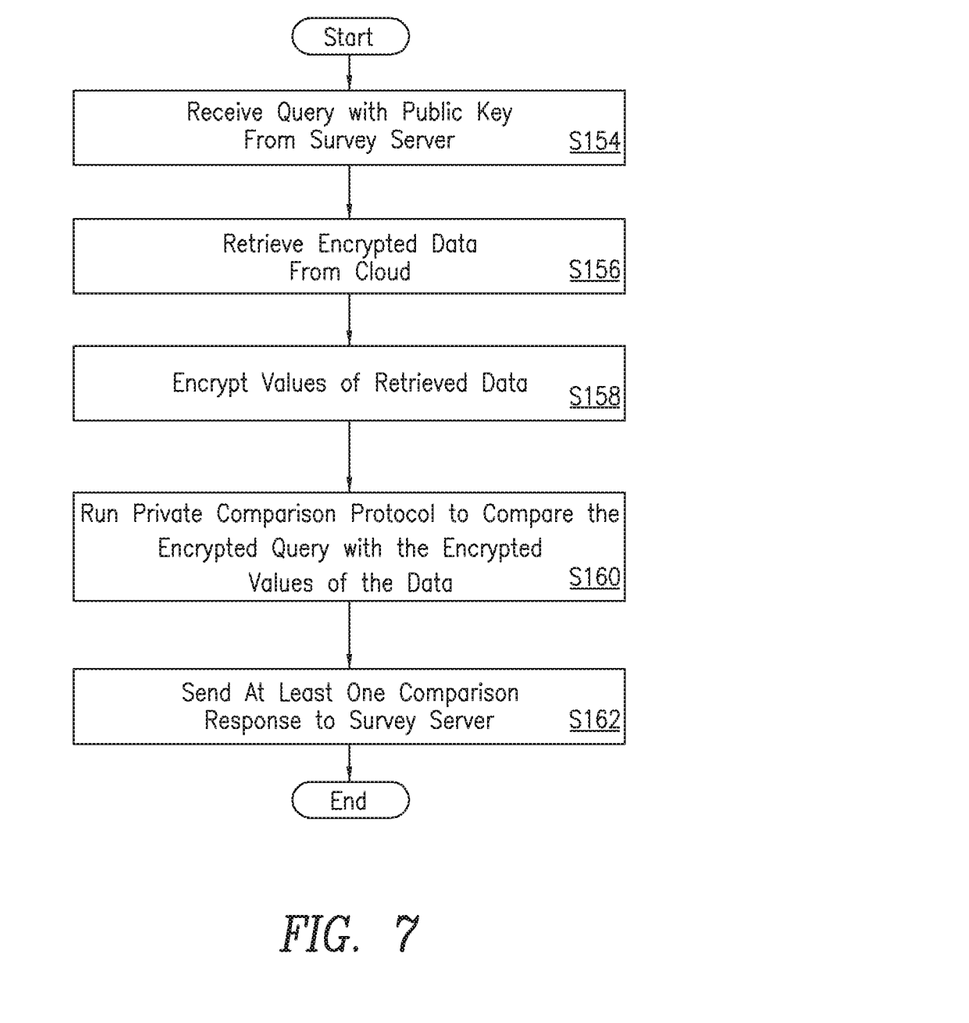
FIG. 7 is a block diagram of a data retrieval process in accordance with the principles of the present invention.

An exemplary data requesting process of data holding entity 18 is described with reference to FIG. 7. Data holding entity 18 receives a query encrypted with a public key from survey server 14 (Block S154). Data holding entity 18 fetches or retrieves encrypted data, e.g., health data, associated with data holding entity 18 from cloud 30 (Block S156). For example, data holding entity 18 may have data corresponding to its respective user stored in cloud 30. Data holding entity 18 receives retrieved data from cloud 30 and encrypts the data, e.g., health data, corresponding to rows related to the query using the public session key of the asymmetric cryptosystem such as a semantically secure cryptosystem (Block S158). For example, attributes such as age and disease of the retrieved data related to the query are encrypted. In one embodiment, the asymmetric cryptosystem is a semantically security cryptosystem. In another embodiment, the asymmetric cryptosystem is a Goldwasser-Micali cryptosystem. Therefore, the constants in the query and the corresponding portion of data, e.g., health data, related to the query are encrypted with the same asymmetric cryptosystem, e.g., semantically secure cryptosystem, Goldwasser-Micali cryptosystem, etc. In one embodiment, one or more data holding entities 18 may store the data, e.g., health data, such that the one or more data holding entities 18 do not have to fetch the data from cloud 30, i.e., Block S156 may be omitted with respect to at least one data holding entity 18. In another embodiment, one or more data holding entities 18 may be part of cloud 30.

Data holding entity 18 runs a private comparison protocol to compare the query with the encrypted values of the data, e.g., health data (Block S160). The private comparison protocol may be based on a homomorphic cryptography, among other type of private comparison protocols. In one embodiment, data holding entity 18 runs the first part of the private comparison protocol to compare constants in the query with their corresponding encrypted and retrieved data in which both are encrypted with the same asymmetric cryptosystem as discussed above with respect to S112 and S114. For example, data holding entity 18 runs the first part of the private comparison protocol based on homomorphic cryptography such as Fischlin's protocol to compare encrypted constants in the query with their corresponding encrypted and retrieved data, e.g., health data, in which both are encrypted with the same asymmetric cryptosystem. Data holding entity 18 sends the output of the private comparison protocol to survey server 14, i.e., one or more data holding entities 18 send at least one comparison response to survey server 14 (Block S162). In one embodiment, the comparison response of the private comparison protocol is the output from Fisclin's protocol ($\Delta$, c) in which both $\Delta$ and c are ciphertext sequences that are encrypted by the same asymmetric cryptosystem, e.g., semantically secure cryptosystem, Goldwasser-Micali cryptosystem, etc., using the same public key (pk). Further, even if another query is received requesting the same result, the respective ciphertext sequences ($\Delta$, c) that are output will not be the same as the ciphertext sequences as the previously run query, thereby, helping to prevent correlation of encrypted data to one or more data holding entities 18.

Figure 8:
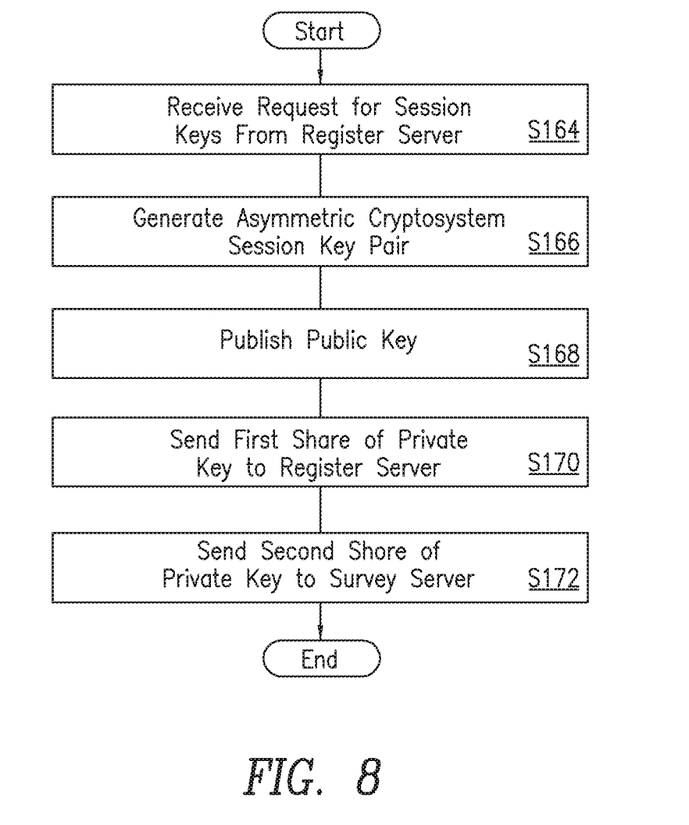
FIG. 8 is a block diagram of the session key process in accordance with the principles of the present invention.

An exemplary process for distributing session keys is described with reference to FIG. 8. PKG 16 receives a request for session keys from requester server 12 as described in S100 (Block S164). In response to the received request for session keys, PKG 16 generates an asymmetric cryptosystem session key pair (Block S166). The session key pair may include private, i.e., secret, key (sk) and public key (pk). PKG 16 may be the only trusted device or server in system 10 that is responsible for generating session keys, i.e., session key pair, that are needed to run the present invention's protocol for searching privately encrypted data on semi-trusted cloud 30 while preserving the privacy of data of data holding entity 18 and query constants from requester server 12. The issued session key pair advantageously allows requester server 12 and survey server 14 to cooperate to execute the query without comprising the privacy of the entity making the query, e.g., health organization, and the user(s) associated with the sensitive data being queried, e.g., patients.

In one embodiment, the asymmetric cryptosystem is a semantically secure cryptosystem. In one embodiment, the semantically secure cryptosystem is a Goldwasser-Micali (GM) cryptosystem. PKG 16 publishes public key (pk) (Block S168). For example, public key (pk) is made public to multiple entities in system 10 such that public key (pk) may be used by requester server 12 to encrypt constant in query as discussed in S106, and may be used by data holding entity to encrypt retrieved or fetched data, e.g., health data, to perform the private comparison, i.e., run the private comparison protocol.

PKG 16 splits the private key (sk) using an asymmetric cryptosystem threshold protocol such as a semantically secure cryptosystem or a Goldwasser-Micali (GM) threshold protocol. For example, private key (sk) is split into a first share of the private key ($sk_1$) and a second share of the private key ($sk_2$). PKG 16 sends the first share of the private key ($sk_1$) to requester server 12 (Block S170). PKG 16 sends the second share of the private key ($sk_2$) to survey server 14 (Block S172). In another embodiment, PKG 16 splits the private key (sk) into three or more shares, i.e., $sk_1$, $sk_2$, ... $sk_n$, in which the respective shares of the private key (sk) are allocated among one or more entities, e.g., requester server 12 and survey server 16, in system 10 in accordance with the principles of the invention.

In one implementation of the present invention, the programmatic software code was written in Java and run on a laptop with an Intel core i5-3317U CPU @ 1.70 GHz, and 6 GB RAM. The assumption is made with the case of comparing 200, 500 and 1000 encrypted values using Fischlin's protocol without threshold encryption. This allows for the calculation of the cost of running Fischlin's protocol on the clients' side to compare its values with the requester server 12. Further, the assumption is made that the encryption key size is 256 bits. Increasing the number of bits in the key size increases security, but also increases the calculation time. Table 1 shows the results.

TABLE 1

| Number of Patients | Calculating ($\Delta$, c) run by Patient (data holding entity 18) | | Analyzing $\Delta$, c (run by Survey Server 14) | |
|---|---|---|---|---|
| | Total | Per Patient | Total | Per Comparison |
| 200 | 36165 ms | 180 ms | 119156 ms | 595 ms |
| 500 | 91571 ms | 176 ms | 300007 ms | 600 ms |
| 750 | 144489 ms | 192 ms | 453235 ms | 604 ms |
| 1000 | 186079 ms | 186 ms | 616420 ms | 616 ms |

Table 1 shows that that the time needed to calculate ($\Delta$, c), discussed above, is 180 ms per patient or data holding entity 18. Calculating ($\Delta$, c) is executed by the patients or data holding entities 18 in parallel. However, analyzing ($\Delta$, c) is performed by survey server 14 and its execution ran for an average of 600 ms per ($\Delta$, c). Although, the time needed to analyze ($\Delta$, c) is high, survey server 14 has higher resources compared to the laptop used to run this implementation. Thus using multiple threads and a powerful server for survey server 14 will reduce the execution time.

The present invention advantageously provides a server and method to achieve secure extraction of information from sensitive data, e.g., health records, based on sharing responsibilities of this extraction between requester server 12 and survey server 14 using the techniques of threshold Crypto, asymmetric cryptosystem and private comparison protocol, e.g., GM-Fischlin, to hide from both requester server 12 and survey server 14 the mapping between the results of the comparison and the data holding entity 18 associated with the sensitive data. The present invention's comparison protocols that are used to verify the conditions in the query are run on the patients' side, thereby never sending any encrypted sensitive data, e.g., medical or health records. Thus preserving the privacy of users associated with data holding entities 18. Further, the constants, e.g., age of 20, within the query are not revealed to entities in the system, thus preserving the privacy of the entity making the query, e.g., a health organization. In health organization/patient example, health organizations are able to search privately encrypted data on semi-trusted cloud 30 while preserving the privacy of the patients and health organizations. In other words, the present invention advantageously provides server, method and protocol for allowing health organizations to produce statistical information about encrypted personal health records stored in cloud 30 without decryption, where survey server 14 may be untrusted by the patients and the health organization.

The present invention advantageously provides a server and method for using private comparison protocols to achieve privacy-preserved querying on privately encrypted data on cloud 30. In one embodiment, privacy preservation is accomplished by using a GM threshold cryptosystem along with randomization and Fischlin's protocol. In particular, the present invention allows for execution of various types of queries, e.g., SQL queries, such as equality or range queries, while preserving the privacy of users, e.g., patients, associated with data holding entity 18 and the entity, e.g., health organization, associated with the query. Further, the present invention uses two semi-trusted entities, i.e., requester server 12 and survey server 14, that use private comparison protocols, described herein, to compare the encrypted values. The asymmetric cryptography helps prevent plaintext attacks. Further, the threshold cryptography prevents requester server 12 and survey server 14 from viewing the retrieved data, e.g., patient data or medical records, being compared. The present invention advantageously randomizes the results in the array, as discussed in S116-118, in order to prevent survey server from correlating a result to a specific data holding entity 18, i.e., patient. Further, the present invention is equally applicable to non-cloud based environments where one party queries privately encrypted data while preserving the privacy of both parties.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A survey server for managing a query for information from a requester server, the requester server holding a first share of a private key, the survey server holding a second share of the private key, the private key being associated with a public key in an asymmetric cryptosystem, the survey server comprising:
   a transceiver configured to:
      receive an encrypted query from the requester server, the query being encrypted using the public key;
      forward the query from the requester server to at least one data holding entity;
      in response to the forwarding of the query, receive a plurality of comparison responses from the at least one data holding entity, each comparison response being generated by a private comparison protocol that compares the encrypted query with encrypted data of the at least one data holding entity, the encrypted data having been encrypted using the public key;
      forward the plurality of comparison responses to the requester server; and
      receive a randomized array including the plurality of comparison responses, each comparison response having been partially decrypted with the first share of the private key and placed in the array in a randomized order; and
   a processor configured to:
      decrypt the randomized array using the second share of the private key;
      determine at least one result of the query based at least in part on the decrypted randomized array; and
      instruct the transceiver to send the at least one result of the query to the requester server.

2. The survey server of claim 1, wherein the private comparison protocol is one of a Fischlin's protocol and based on homomorphic cryptography.

3. The survey server of claim 1, wherein the randomized array is received from the requester server that transmitted the encrypted query to the survey server.

4. The survey server of claim 1, wherein the asymmetric cryptosystem is a semantically secure cryptosystem that allows for secure private comparison between encrypted values.

5. The survey server of claim 4, wherein the query from the requester server includes at least one constant that is encrypted using the semantically secure cryptosystem and at least one comparison condition for comparing the constants to encrypted data.

6. The survey server of claim 4, wherein the semantically secure cryptosystem is a Goldwasser-Micali cryptosystem.

7. The survey server of claim 6, wherein the at least one comparison condition is at least one of an equal to condition, greater than condition and less than condition.

8. The survey server of claim 1, wherein each of the plurality of comparison responses includes at least one ciphertext sequence that is encrypted by the asymmetric cryptosystem.

9. A method for a survey server for managing query communications between at least a requester server and at least one data holding entity, the requester server holding a first share of a private key, the survey server holding a second share of the private key, the private key being associated with a public key in an asymmetric cryptosystem, the method comprising:
   receiving an encrypted query for information from the requester server, the query being encrypted using the public key;
   forwarding the query from the requester server to at least one data holding entity;
   in response to the forwarding of the query, receiving a plurality of comparison responses from the at least one data holding entity, each comparison response being generated by a private comparison protocol that compares the encrypted query with encrypted data of the at least one data holding entity, the encrypted data having been encrypted using the public key;
   forwarding the plurality of comparison responses to the requester server;
   receiving a randomized array including the plurality of comparison responses, each comparison response having been partially decrypted with the first share of the private key and placed in the array in a randomized order;
   decrypting the randomized array using the second share of the private key;
   determining at least one result of the query based at least in part on the decrypted randomized array; and sending the at least one result of the query to the requester server.

10. The method of claim 9, wherein the private comparison protocol is one of a Fischlin's Protocol and based on homomorphic cryptography.

11. The method of claim 9, wherein the randomized array is received from the requester server that transmitted the encrypted query to the survey server.

12. The method of claim 9, wherein the asymmetric cryptosystem is a semantically secure cryptosystem that allows for secure private comparison between encrypted values.

13. The method of claim 12, wherein the query from the requesting server includes at least one constant that is encrypted using the semantically secure cryptosystem and at least one comparison condition for comparing the constants to encrypted data.

14. The method of claim 13, wherein the at least comparison condition is at least one of an equal to condition, greater than condition and less than condition.

15. The method of claim 9, wherein each of the plurality of comparison responses includes at least one ciphertext sequence that is encrypted by the asymmetric cryptosystem.

16. A survey server for managing a query from a requester server, the requester server holding a first share of a private key, the survey server holding a second share of the private key, the private key being associated with a public key in a asymmetric cryptosystem, the survey server comprising:
a transceiver module configured to:
receive an encrypted query request from the requester server, the query being encrypted using the public key;
forward the query from the requester server to at least one data holding entity;
in response to the forwarding of the query, receive a plurality of comparison responses from the at least one data holding entity, each comparison response being generated by a private comparison protocol that compares the encrypted query with encrypted data of the data holding entity, the encrypted data having been encrypted using the public key;
forward the plurality of comparison responses to the requester server;
receive a randomized array including the plurality of comparison responses, each comparison response having been partially decrypted with the first share of the private key and placed in the array in randomized order by the requester server; and
a processing module configured to:
decrypt the randomized array using the second share of the private key;
determine at least one result of the query based at least in part on the decrypted randomized array; and
instruct the transceiver module to send the at least one result of the query to the requester server.

17. The survey server of claim 16, wherein the private comparison protocol is Fischlin's protocol.

18. The survey server of claim 16, wherein the asymmetric cryptosystem is a semantically secure cryptosystem that allows for secure private comparison between encrypted values.

19. The survey server of claim 18, wherein the query from the requesting server includes at least one constant that is encrypted using the semantically secure cryptosystem and at least one comparison condition for comparing the constants to encrypted data; and
the at least comparison condition is at least one of an equal to condition, greater than condition and less than condition.

20. The survey server of claim 16, wherein each of the plurality of comparison responses includes at least one ciphertext sequence that is encrypted by the asymmetric cryptosystem.

* * * * *